United States Patent Office 3,616,480
Patented Nov. 2, 1971

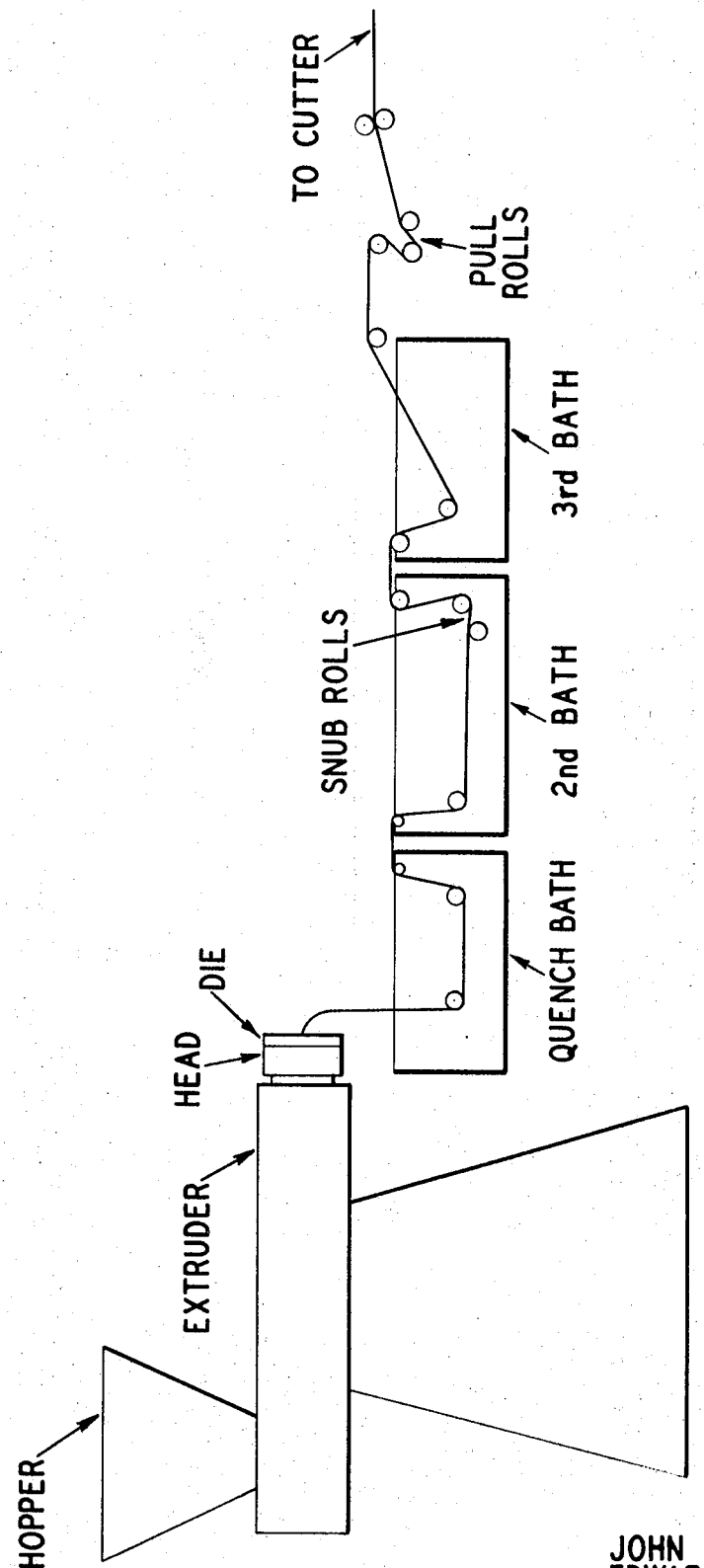

3,616,480
FLAGGED BRISTLE
John Feroce, Cincinnati, and Edward D. Zelinski, Urbana, Ohio, assignors to The Drackett Company, Cincinnati, Ohio
Filed Nov. 19, 1968, Ser. No. 777,069
Int. Cl. A46b 1/00
U.S. Cl. 15—159 A    5 Claims

ABSTRACT OF THE DISCLOSURE

The invention is concerned with new flaggable bristle formations useful in the manufacture of brooms. The formulations are comprised of a mixture of two or more incompatible thermoplastic resins from the following groups:
(1) Propylene copolymers, ethylene copolymers, polyallomer block copolymers, and mixtures of these.
(2) Polystyrene, acrylonitrile-butadiene styrene terpolymers and mixtures of these.

---

The process for preparing the bristles comprises heating the resin mixture, extruding through a heated chamber, quenching, heating, rolling, stretching, cooling and cutting.

This invention is concerned with synthetic resin filaments and to their method of preparation. More particularly the invention relates to flaggable bristles suitable for use in brooms, brushes and the like.

In the preparation of bristles used in the manufacture of brushes and brooms the replacement of animal hairs and vegetable fibers with various synthetic filaments represents various improvements in the art. Synthetic filaments afford such advantages as reduction in cost, ease of manufacture, and improved durability. In order to further improve the properties and to more closely approximate the effect obtained with bristles made from natural fibers, bristles made from synthetic filaments have been treated by the exertion of a force to effect shattering. This treatment is known in the art as "flagging." Various patents have issued in this art, which incorporate improvements either in the particular resin compositions used or in the process of preparation and treatment. For example, U.S. Pat. 3,173,163 relates to flagged brush bristles and describes the extrusion of incompatible resins to enhance the flagging effect. The bristles consist of a mixture of isotactic polypropylene and an incompatible synthetic resin such as polystyrene or styrene-acrylonitrile copolymer. U.S. Pat. 3,295,156 is concerned with a toothbrush having synthetic fibers which are flagged. The fibers may be polyamides, polyesters, polyacrylates, polystyrene or styrene-acrylonitrile copolymers. U.S. Pat. 2,207,156 relates to an artificial bristle and a method of making. The bristle is formed of a composite of parallel filaments or strands encased in a resin. Flagging is effected by first coating the individual strands, then winding them together and applying a second resin coat to only a portion of the bristle so that the ends are free.

It is an object of this invention to provide new and improved compositions from which bristles may be prepared.

It is a further object of the invention to provide a method for preparing bristles from new thermoplastic resin formulations.

It is also an object of the present invention to provide new formulations of thermoplastic, synthetic resin compositions from which flaggable bristles may be prepared.

The present invention is drawn to new synthetic resin compositions and to the method of preparing flaggable bristles from these compositions. The bristles made in accordance with this invention are useful in the manufacture of brooms, brushes and the like.

The compositions developed in accordance with this invention are comprised of a mixture of two or more incompatible thermoplastic resins, one member being selected from each of the following groups: Group I consists of propylene ethylene copolymers, propylene ethylene polyallomer block copolymers, and mixtures of these. Group II consists of polystyrene, acrylonitrile-butadiene-styrene terpolymers, and mixtures of these. Some examples of the above-mentioned resins are: propylene-ethylene copolymer, density .900 (Olemer No. 6014, Avisun Corp.), propylene-ethylene polyallomer block copolymer, density .902 (Polyallomer 5B21 and 5021, Eastman Chemical Prod.), ethylene vinyl acetate copolymer, density .920 (Zetafin [1] 120, Dow Chemical), acrylonitrile-butadiene-styrene terpolymer, density 1.05 (Tybrene 213, Dow Chemical), polystyrene homopolymers, densities 1.04–1.05 (Styron [2] 475, 686, and 690, Dow Chemical).

The polymers employed in the mixtures of the present invention are well known and may be prepared by conventional methods known in the art. For example, the propylene ethylene copolymers may be prepared by the copolymerization of propylene and ethylene monomers, and ethylene vinyl acetate copolymers may be prepared by the copolymerization of ethylene and vinyl acetate monomers. See also U.S. Pat. 3,132,194 and 2,825,821.

Suitable bristles made in accordance with this invention comprise mixtures of resins from Groups I and II ranging from 3–96% by weight from Group I and from 3–96% by weight from Group II. Preferred ranges are 10–20% by weight from Group I and 3–90% by weight from Group II.

Conventional adjuvants may be employed in the resin mixtures, such as pigments, lubricants, fillers, stiffeners and other modifiers.

The improved process for preparing the bristles of this invention incorporates different materials, temperatures, stretch, and fiber orientation from those employed heretofore in the prior art.

The figure illustrates the various stages used in the bristle preparation.

The mixed resin pellets and pigments are placed in the hopper which is adjusted to about 110° F. From there the mixture passes into and through the extrusion chamber which is heated to about 400 to 500° F. It then is forced through the die, which contain holes for forming the molten resin into separate strands of circular cross section. After emerging from the die the strands pass into a quench bath which is kept at 150–200° F. This forms a hardened skin around the outside of each strand. The strands then pass into a heating bath kept at 250–300° F. Before emerging from this bath the strands pass over snub rolls. They then go through a cooling bath kept at 40–80° F. and over pull rolls to a cutter where they are cut into convenient lengths for stapling into broom heads. The pull rolls travel at a greater surface speed than the snub rolls and this imparts stretch and orientation to the strands. The stretch is imparted between the snub rolls and the entrance to the cooling bath.

Flagging of the bristles may be effected by any of the various methods known in the art. Cold drawing or subjecting the bristles to impact are two examples.

The following examples of particular compositions and process conditions are given by way of further explanation of the invention.

---

[1] Zetafin is a trademark registered by Dow Chemical.
[2] Styron is a trademark registered by Dow Chemical.

EXAMPLE 1

| Ingredient: | Percent by wt. |
|---|---|
| Avisun 6014 | 20.00 |
| Tybrene 213 | 3.00 |
| Dow 475 | 42.67 |
| Dow 690 | 33.33 |
| Dow color 7386 | 1.00 |
| | 100.00 |

Operating conditions:
- Head heat—425° F.
- Front heat—425° F.
- Center heat—440° F.
- Back heat—450° F.
- First tank—200° F. (quench)
- Second tank—375° F. (brine)
- Third tank—Tap. temp. (rinse)
- Screw speed—26 r.p.m.
- Snub roll—38 ft./min.
- Pull roll—150 ft./min.
- Orientation—3.9:1

EXAMPLE 2

| Ingredient: | Percent by wt. |
|---|---|
| Styron 686 | 51.91 |
| Styron 475 | 25.95 |
| Olemer 6014 | 19.88 |
| Tybrene 213 | .52 |
| Titanium dioxide | .69 |
| Pigment dye | 1.04 |
| Zinc stearate | .01 |
| | 100.00 |

Running conditions:
- Extruder:
  - Head heat—450° F.
  - Front heat—465° F.
  - Center heat—450° F.
  - Back heat—465° F.
- First tank (quench)—180° F.
- Second tank—280–290° F.
- Third tank (cooling)—60° F.
- Screw speed—26 r.p.m.
- Snub rolls—40 ft./min.
- Pull rolls—140 ft./min.
- Orientation—3.50:1

EXAMPLE 3

| Ingredient: | Percent by wt. |
|---|---|
| Polyallomer 5B21 | 19.64 |
| Styron 690 | 78.74 |
| Titanium dioxide | 1.30 |
| Pigment dye | 0.32 |
| | 100.00 |

EXAMPLE 4

| Ingredient: | Percent by wt. |
|---|---|
| QX 4346.63 | 20.0 |
| Styron 690 | 55.7 |
| Styron 475 | 23.9 |
| Titanium dioxide | 0.4 |
| | 100.00 |

EXAMPLE 5

| Ingredient: | Percent by wt. |
|---|---|
| Polyallomer 5021 | 19.7 |
| Styron 690 | 65.6 |
| Styron 475 | 13.1 |
| Titanium dioxide | 1.0 |
| Pigment dye | 0.6 |
| | 100.00 |

EXAMPLE 6

| Ingredient: | Percent by wt. |
|---|---|
| Zetafin 120 | 10.0 |
| Styron 690 | 62.7 |
| Styron 475 | 26.9 |
| Titanium dioxide | 0.4 |
| Carbon black pigment | 0.02 |
| | 100.02 |

Running conditions for Examples 3 to 6 were approximately the same as for Example 2 except for the orientation ratios which were as follows:

| | |
|---|---|
| Example 3 | 4.58:1 |
| Example 4 | 3.7:1 |
| Example 5 | 3.57:1 |
| Example 6 | 3.57:1 |

EXAMPLE 7

| Ingredient: | Percent by wt. |
|---|---|
| Styron 686 | 51.91 |
| Styron 475 | 25.95 |
| Olemer 6014 | 19.88 |
| Tybrene 213 | .52 |
| Titanium dioxide | .69 |
| Pigment dye | 1.04 |
| Zinc stearate | .01 |
| | 100.00 |

Running conditions:
- Extruder:
  - Head heat—450° F.
  - Front heat—465° F.
  - Center heat—450° F.
  - Back heat—465° F.
- First tank (quench)—180° F.
- Second tank—280–290° F.
- Third tank (cooling)—60° F.
- Screw speed—26 r.p.m.
- Snub rolls—40 ft./min.
- Pull rolls—140 ft./min.
- Orientation—2:1

EXAMPLE 8

| Ingredient: | Percent by wt. |
|---|---|
| Styron 686 | 51.91 |
| Styron 475 | 25.95 |
| Olemer 6014 | 19.88 |
| Tybrene 213 | .52 |
| Titanium dioxide | .69 |
| Pigment dye | 1.04 |
| Zinc stearate | .01 |
| | 100.00 |

Running conditions:
- Extruder:
  - Head heat—450° F.
  - Front heat—465° F.
  - Center heat—450° F.
  - Back heat—465° F.
- First tank (quench)—180° F.
- Second tank—280–290° F.
- Third tank (cooling)—60° F.
- Screw speed—26 r.p.m.
- Snub rolls—40 ft./min.
- Pull rolls—140 ft./min.
- Orientation—6:1

The invention has been described herein with particular reference to preferred embodiments. However various modifications from the specific details given may occur to those skilled in the art without departing from the spirit and scope of the invention sought to be protected.

We claim:

1. A longitudinally oriented flagged bristle comprising a mixture of incompatible thermoplastic resins comprising propylene ethylene copolymer and acrylonitrile-butadiene-styrene terpolymer.

2. A longitudinally oriented flagged bristle comprising a mixture of incompatible thermoplastic resins comprising ethylene vinyl acetate copolymer and acrylonitrile-butadiene-styrene terpolymer.

3. A longitudinally oriented flagged bristle comprising a mixture of incompatible thermoplastic resins comprising polyallomer block copolymer and acrylonitrile-butadiene-styrene terpolymer.

4. The bristle according to claim 1 wherein the mixture comprises additionally a pigment, a lubricant and a stiffener.

5. A broom comprising the flagged bristles according to claim 1.

References Cited

UNITED STATES PATENTS

| | | | |
|---|---|---|---|
| 3,173,163 | 3/1965 | Cramton | 15—159 |
| 3,402,416 | 9/1968 | Shaw et al. | 15—159 |

ROBERT F. BURNETT, Primary Examiner

L. M. CARLIN, Assistant Examiner

U.S. Cl. X.R.

161—172

UNITED STATES PATENT OFFICE
CERTIFICATE OF CORRECTION

Patent No. 3,616,480      Dated November 2, 1971

Inventor(s) John Feroce et al.

It is certified that error appears in the above-identified patent and that said Letters Patent are hereby corrected as shown below:

Column 2, line 28, "2,825,821" should read -- 2,825,721 --; line 48, "contain" should read -- contains --.

Signed and sealed this 29th day of August 1972.

(SEAL)
Attest:

EDWARD M. FLETCHER, JR.　　　　　　ROBERT GOTTSCHALK
Attesting Officer　　　　　　　　　Commissioner of Patents